(12) United States Patent
Görge et al.

(10) Patent No.: US 6,699,453 B1
(45) Date of Patent: Mar. 2, 2004

(54) SPHEROIDALLY AGGLOMERATED BASIC COBALT(II) CARBONATE AND SPHEROIDALLY AGGLOMERATED COBALT(II) HYDROXIDE, PROCESS FOR THEIR PRODUCTION AND THEIR USE

(75) Inventors: Astrid Görge, Goslar (DE); Juliane Meese-Marktscheffel, Goslar (DE); Dirk Naumann, Ontario (CA); Armin Olbrich, Seesen (DE); Frank Schrumpf, Goslar (DE)

(73) Assignee: H.C. Starck GmbH & Co KG, Goslar (DE)

( * ) Notice: Subject to any disclaimer, the term of this patent is extended or adjusted under 35 U.S.C. 154(b) by 698 days.

(21) Appl. No.: 08/952,913
(22) PCT Filed: May 14, 1996
(86) PCT No.: PCT/EP96/02050
§ 371 (c)(1),
(2), (4) Date: Nov. 24, 1997
(87) PCT Pub. No.: WO96/37436
PCT Pub. Date: Nov. 28, 1996

(30) Foreign Application Priority Data

May 26, 1995 (DE) ......................... 195 19 326

(51) Int. Cl.⁷ .............................................. C01G 51/06
(52) U.S. Cl. .................................................. 423/419.1
(58) Field of Search ........................... 423/419.1, 420.2; 126/286.3, 480

(56) References Cited

U.S. PATENT DOCUMENTS

| 34,752 A | | 3/1862 | Herrick ........................ 126/218 |
| 4,002,719 A | * | 1/1977 | Tsao ........................ 423/419.1 |
| 4,985,318 A | | 1/1991 | Oshitani et al. ............ 429/223 |
| 5,240,692 A | | 8/1993 | Morifuji ..................... 423/431 |

FOREIGN PATENT DOCUMENTS

| EP | PCT/EP96/02050 | 7/1997 |
| GB | 1 437 191 | 5/1976 |
| SU | 219 592 | 6/1968 |

OTHER PUBLICATIONS

Chemical Abstracts, vol. 92, No. 8, Abstract No. 61186; XP002012046 & JP–A 54 131 597.
Derwent AN 78–27542; XP 002012047 & JP–A 53 021 099.
Derwent AN 77–86019Y; XP 002012048 & SU–A 548 570.
Derwent AN 92–118237; XP 002012049 & JP–A 04 059 622.
Abstract of JP 53–22 193 A2

* cited by examiner

*Primary Examiner*—Stuart L. Hendrickson
(74) *Attorney, Agent, or Firm*—Godfried R. Akorli; Diderico van Eyl (57) ABSTRACT

The present invention relates to basic cobalt(II) carbonate, agglomerated from fine primary particles and of general composition $Co[(OH)_2]_a[CO_3]_{1-a}$, where $0.1 \leq a \leq 0.9$, and to spheroidal cobalt(II) hydroxide, to a process for producing them and to their use.

7 Claims, 10 Drawing Sheets

SPHEROIDALLY AGGLOMERATED BASIC COBALT(II) CARBONATE AND SPHEROIDALLY AGGLOMERATED COBALT(II) HYDROXIDE, PROCESS FOR THEIR PRODUCTION AND THEIR USE

The present invention relates to basic cobalt(II) carbonate, agglomerated from fine primary particles and of general composition $Co[(OH)_2]_a[CO_3]_{1-a}$, where $0.1 \leq a \leq 0.9$, and to spheroidal cobalt(II) hydroxide, to a process for producing them and to their use.

Pure-phase cobalt(II) hydroxide is required for a series of industrial applications. For example, it can be used directly or after prior calcination to form cobalt(II) oxide as a component in the positive electrode of modern high-capacity secondary batteries based on nickel/cadmium or nickel/metal hydride.

It is uniformly distributed in the electrode material, via cobaltates(II) formed as intermediates which are soluble in the alkaline electrolyte of the battery (30% by weight KOH), and is deposited there by oxidation in what is termed the forming cycle as an electrically conductive CoOOH layer on the nickel hydroxide particles. Proportions of cobalt(II) which are present in the starting material do not form soluble cobaltates and therefore cannot be utilised.

The use of cobalt compounds in alkaline secondary batteries based on nickel/cadmium or nickel/metal hydride is disclosed in EP-A 353837. In addition, pure cobalt(II) oxides are used in electronics and catalyst technology.

Cobalt(II) hydroxide or carbonate is also used for the production of other cobalt compounds. Amongst others, these include the cobalt salts of weak acids, which are termed metal soaps. These are not only used as driers for lacquers and varnishes, but are also employed as catalysts, just like cobalt(II) oxide.

The catalytic use of cobalt(II) acetate in the production of adipic acid may be cited as an example.

Cobalt(II) hydroxide can be prepared from aqueous solutions of cobalt(II) salts by precipitation with alkaline liquors. The resulting precipitates generally have a gel-like consistency, are difficult to filter and are thus difficult to wash to render them neutral and free from salts. Moreover, they are very sensitive to oxidation in alkaline medium, so that the filtration and washing processes have to be carried out with the careful exclusion of atmospheric oxygen.

The cause of the poor filtration properties is based on the fine structure of the primary crystals and their irregular agglomeration. Fine primary particles are often desired for the applications described above, however. Firstly, fine primary particles dissolve more rapidly in acids, and secondly the calcination or reduction of cobalt(II) hydroxides such as these results in correspondingly fine primary particles of cobalt(II) oxide or cobalt metal powder.

A corresponding cobalt(II) hydroxide with a fine primary particle structure can only be produced at considerable cost by conventional processes, however, so that a large discrepancy exists between the required property profile and a technically stable, reproducible and economical method of production.

The poor filtration and washing behaviour described above does not occur with spheroidally agglomerated primary particles. For example, spherical nickel hydroxide, which is used in modern alkaline secondary batteries, exhibits excellent filtration and washing behaviour.

The production of spherical nickel hydroxide from aqueous solutions of nickel salts by precipitation with alkaline liquors in the presence of ammonia is disclosed in EP-A 353 837. In principle, this process could also be applied to the element cobalt. However, compared with nickel the process is made more difficult due to the generally known fact that cobalt(II) in its complexed state is readily oxidised to its trivalent state. It therefore has to be ensured that atmospheric oxygen is excluded even more rigorously than in the conventional precipitation. A general disadvantage of this process, which applies both to nickel and to cobalt, is the fact that the filtrates contain ammonia and complexed metal cations. A costly effluent treatment procedure cannot therefore be circumvented.

The object of the present invention was therefore to provide a cobalt(II) hydroxide which does not exhibit the prior art disadvantages described and which can be reproducibly produced by an economical process.

It has now been found that spheroidally agglomerated cobalt(II) carbonate having variably adjustable properties, such as average agglomerate diameter and specific surface for example, and which can subsequently be converted into other compounds, e.g. spheroidally agglomerated cobalt(II) hydroxide, in a series of chemical reactions whilst retaining its secondary morphology, can be produced by a technically simple and economical process.

This cobalt carbonate is a basic cobalt(II) carbonate which is agglomerated from fine primary particles, of general composition $Co[(OH)_2]_a[CO_3]_{1-a}$, where $0.1 \leq a \leq 0.9$, wherein the agglomerates have a spheroidal habit and the average agglomerate diameter is 3 to 50 $\mu$m. The agglomerate diameter is preferably 5–20 $\mu$m. The basic cobalt(II) carbonate agglomerates according to the invention preferably have tap densities of $\geq 1.6$ g/cm$^3$ and bulk densities of $\geq 1.2$ g/cm$^3$.

This invention also relates to a process for producing the cobalt(II) carbonate agglomerates according to the invention. This is characterised in that aqueous solutions of cobalt salts of general formula $CoX_2$, where X represents Cl—, $NO_3$— and/or ½ $SO_4^{2-}$—, are reacted with aqueous solutions or suspensions of alkali and/or ammonium carbonates and/or hydrogen carbonates at temperatures between 40 and 100° C., preferably 60 to 90° C., and the resulting basic cobalt(III) carbonate agglomerates are subsequently filtered off and washed until they are neutral and free from salts.

The process according to the invention is preferably carried out with alkali carbonates, both for environmental and economic reasons. However, it may also be carried out using ammonium carbonates in order to obtain products which are particularly low in alkali.

This process is preferably carried out continuously with intensive mixing of the reactants. Residence times in this mode of operation should preferably be between 0.5 hours and 10 hours, most preferably between 1 and 5 hours.

Depending on the process parameters, particularly temperature, concentration, pH, residence time and intensity of stirring, the chemical composition, the size of the primary particles, and the size and distribution of the secondary particles, can be adjusted within wide limits, as is further illustrated in Examples 1 to 4 and FIGS. 1 to 4.

The process according to the invention is characterised by simple process control. The basic cobalt(II) carbonates according to the invention are insensitive to oxidation by atmospheric oxygen, which permits them to be handled easily. Surprisingly, it has emerged that the basic cobalt(II) carbonate agglomerates according to the invention can be converted in highly concentrated suspension with alkaline liquors into pure-phase cobalt(II) hydroxides whilst retaining the spheroidal secondary morphology; this is described in more detail in Examples 5 and 6.

This can be effected in a technically simple batch process. In combination with good sedimentation, filtration and washing behaviour, the best possible screening from atmospheric oxygen can be achieved in this manner, and the process as a whole can also be carried out economically on an industrial scale without high costs.

This invention thus also relates to a process for producing agglomerated cobalt(II) hydroxide, wherein the basic cobalt(II) carbonate agglomerates according to the invention are reacted in suspension with aqueous alkaline liquors and/or ammonia. The cobalt(II) hydroxide agglomerates obtainable by the process according to the invention are characterised in that they consist of spheroidally agglomerated, polygonal, lamellar primary particles which have average diameter to thickness ratios between 3 and 15.

The spheroidal agglomerates have an average diameter of 3–50 $\mu$m, preferably 5 to 20 $\mu$m. Their tap densities are preferably $\geq 1$ g/cm$^3$.

On account of their special properties, such as their high bulk densities, defined and uniform grain size distributions, flowability, etc., the cobalt(II) carbonates and cobalt(II) hydroxides according to the invention are alternatives, which are of commercial interest, to the corresponding conventionally produced cobalt compounds which have an irregular, non-spheroidal secondary structure.

The basic cobalt(II) carbonate agglomerates according to the invention are suitable starting compounds for various applications, e.g. for the production of cobalt(II) salts or for the production of pure-phase cobalt(II) oxide by calcination, which proceeds whilst retaining the secondary morphology.

This invention thus also relates to the use of the basic cobalt(II) carbonate agglomerates according to the invention for the production of spheroidal, free-flowing cobalt(II) oxide and higher oxides by calcination under a protective gas and/or air. The cobalt carbonates are also suitable as starting compounds for the production of other cobalt compounds which can otherwise only be obtained in compact agglomerated form with difficulty or not at all.

As has already been mentioned in the introduction, a series of cobalt(II) salts of weak acids which cannot be obtained by the direct reaction of metallic cobalt with the corresponding acids is of considerable industrial importance. Thus, for example, cobalt(II) acetate is usually obtained by the reaction of conventional cobalt carbonate precipitates with acetic acid. These precipitations are conducted in the cold, and rod-shaped precipitates with a high content of water of crystallisation and which scarcely sediment out are produced.

The basic cobalt(II) carbonate according to the invention does not exhibit the disadvantages just described, but despite this has a high reactivity towards acetic acid for example, so that it can easily be dissolved in acetic acid and cobalt(II) acetate can be obtained from the solution by crystallisation.

It has now been found that a heterogeneous reaction of the spheroidally agglomerated basic cobalt(II) carbonate according to the invention with glacial acetic acid is possible. This produces uniform, acicular crystals of length 10–20 $\mu$m and of diameter about 2 $\mu$m. This reaction should be conducted with an excess of acetic acid so as to be able to suspend the solids sufficiently well. In the industrial process, however, this acetic acid is usefully recycled, so that the process described is also characterised by its economical nature. A fact which should be cited as a beneficial side effect is that final impurities remain in the basic cobalt carbonate after the reaction in the mother liquor (recycle liquor) and can be separated from the latter according to the industrial implementation of the recycling concept. Ultra-pure cobalt(II) acetate is therefore obtained, which like-wise constitutes a source of high-purity cobalt(II) compounds.

Another industrially important cobalt(II) salt of a weak acid is cobalt(II) phosphate. The octahydrate $Co_3(PO_4)_2 \cdot 8H_2O$ is a pink powder and is used to impart a blue coloration to porcelain and glass and for the production of enamels, glazes and pigments.

It can be obtained in a compact agglomerated form by the reaction of the basic cobalt(II) carbonate according to the invention with aqueous phosphoric acid, as described n Example 11.

Reaction with aqueous oxalic acid solutions can be effected in an analogous manner, with the agglomerated secondary morphology being retained, to form cobalt(II) oxalate, which in turn can be used for the production of cobalt metal powders.

The calcination of agglomerated cobalt(II) oxalate, optionally assisted or modified by gaseous reducing agents such as hydrogen, carbon monoxide or dinitrogen monoxide, then provides cobalt metal powders which likewise exhibit an agglomerated secondary structure but which are built up from small primary particles and which could therefore be industrially important.

As described above for the basic cobalt(II) carbonate, the cobalt(II) hydroxide according to the invention can also be used for the production of cobalt(II) salts, or can be calcined further to form pure-phase cobalt(II) oxide whilst retaining its spheroidal secondary structure. This invention thus also relates to the use of the cobalt(II) hydroxide according to the invention for the production of pure cobalt(II) salts for use in bonding agents and catalysts, for the production of spheroidal, free-flowing cobalt(II) oxide or higher oxides, and as a component of the nickel hydroxide electrode in alkaline secondary cells.

This invention also relates to the use of the basic cobalt (II) carbonate agglomerates and/or the cobalt(II) hydroxides according to the invention for the production of cobalt pigments.

The production of the spheroidally agglomerated basic cobalt(II) carbonates and cobalt(II) hydroxides, and the further processing thereof to produce diverse secondary products, are described in the following examples, without being limited thereto.

EXAMPLE

Examples 1–4

Production of Basic Cobalt(II) Carbonate

Production of the basic cobalt(II) carbonates according to the invention was effected in Examples 1 to 4 in a continuously operated flow reactor with a radial flow stirrer, with the simultaneous addition of aqueous cobalt chloride solutions and aqueous alkali hydrogen carbonate or alkali carbonate solutions. The metered addition of the solutions was effected using oscillating piston pumps, which operated very accurately and constantly. The temperatures were held constant over the entire duration of the reaction via a regulable thermostat.

Samples were taken for work-up and further processing to form secondary products after the reactor had reached its stationary state. Work-up was effected by first allowing the solids to settle and separating about 80% of them from the mother liquor by decantation. The thickened suspension was transferred to a suction filter, the precipitate formed was filtered off and washed with about 10 l of wash water per kg of cobalt at the temperature of reaction, and the filter cake was subsequently dried to constant weight at 80° C. in a drying oven. The reaction parameters and characteristic product properties are listed in Table 1.

TABLE 1

Examples 1–4; production of basic cobalt(II) carbonates

Figure 1:
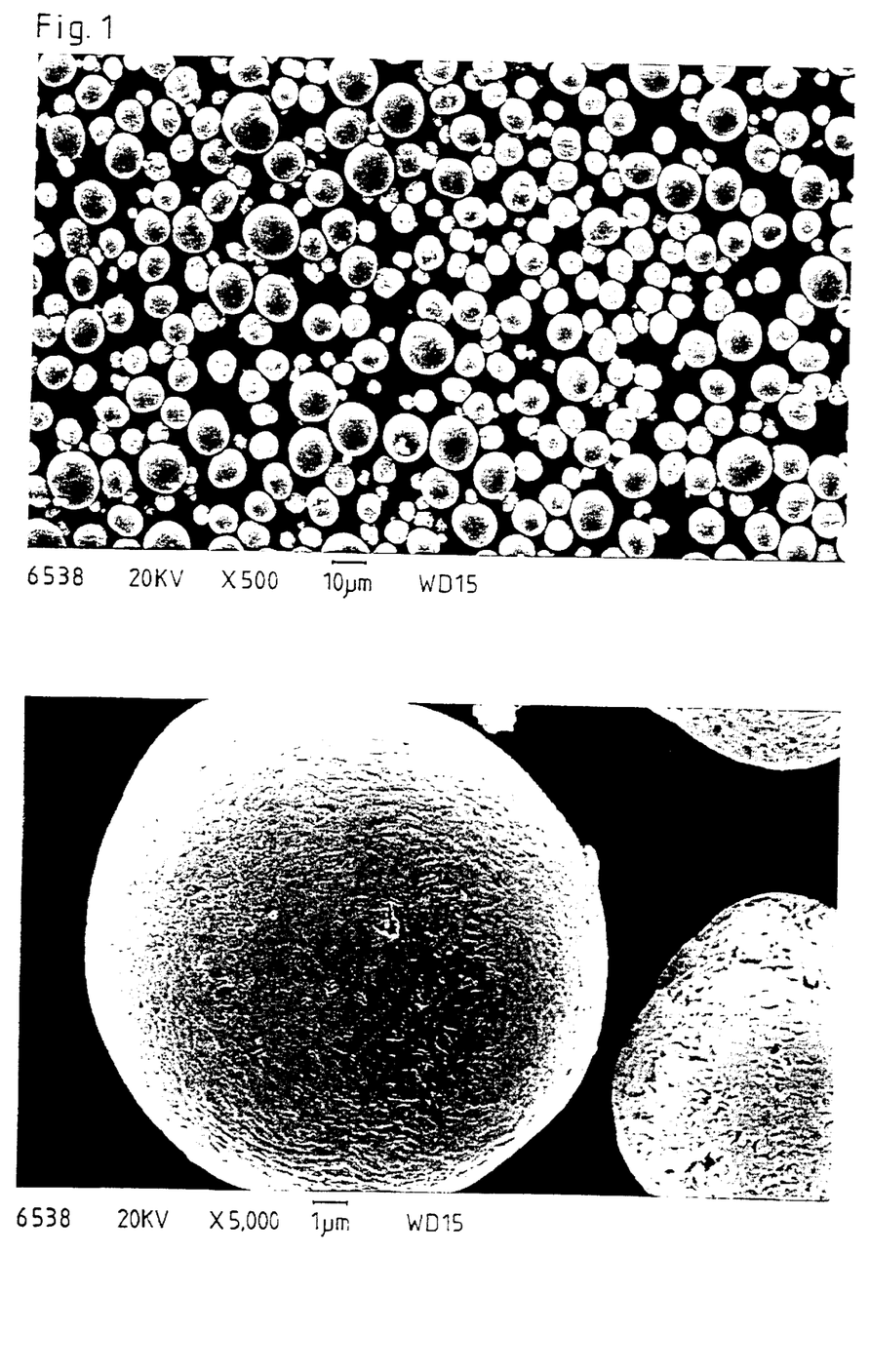
Figure 2:
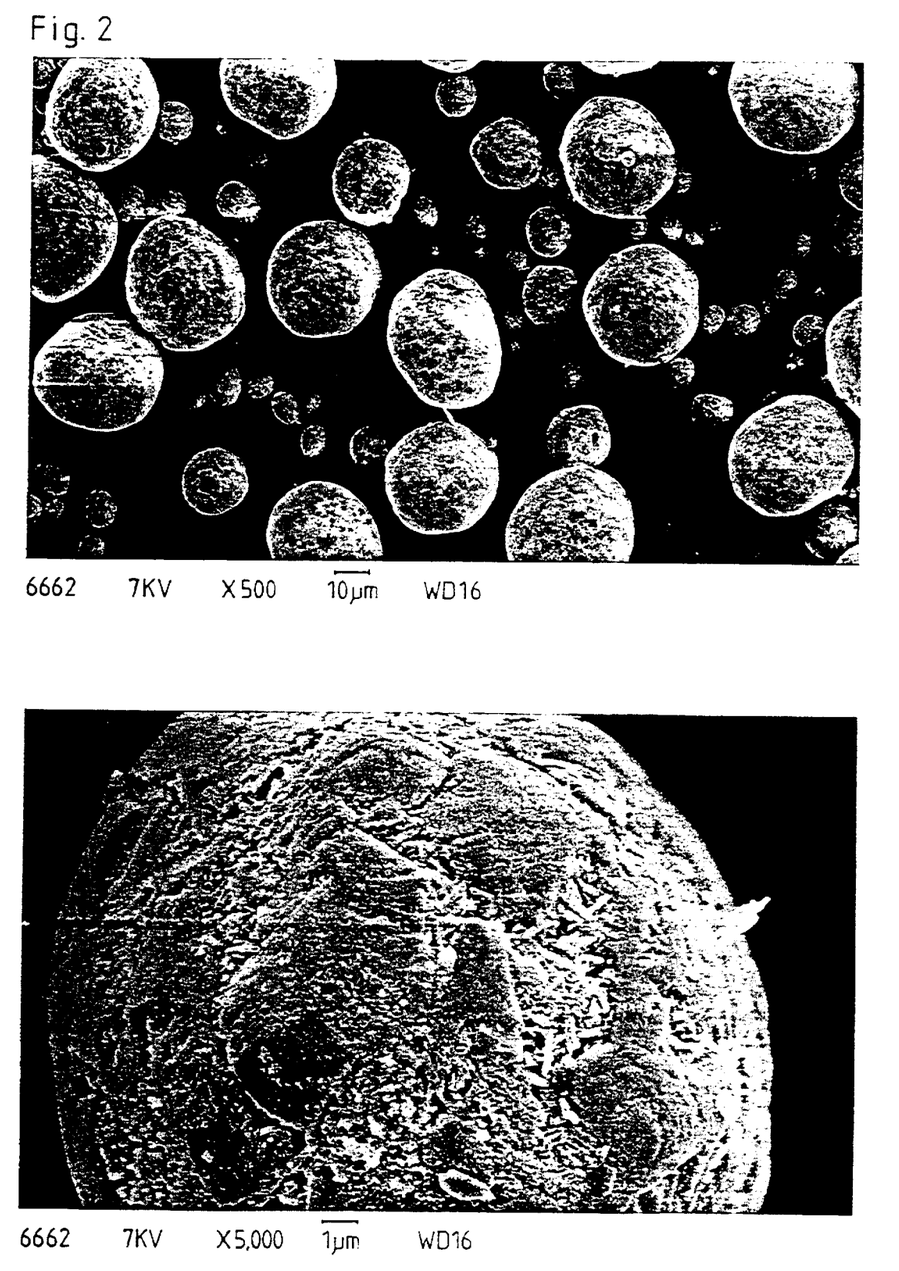
Figure 3:
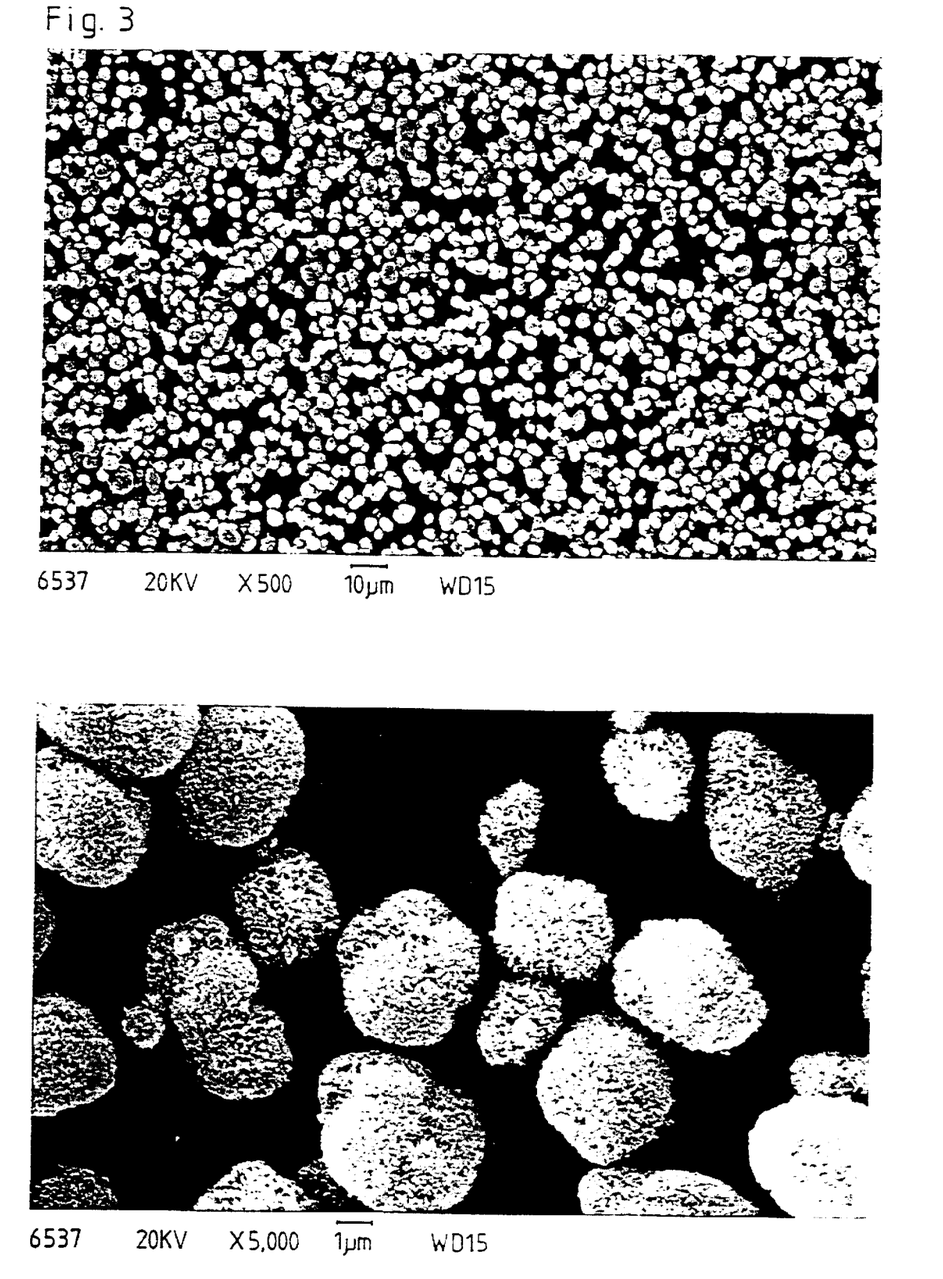
Figure 4:
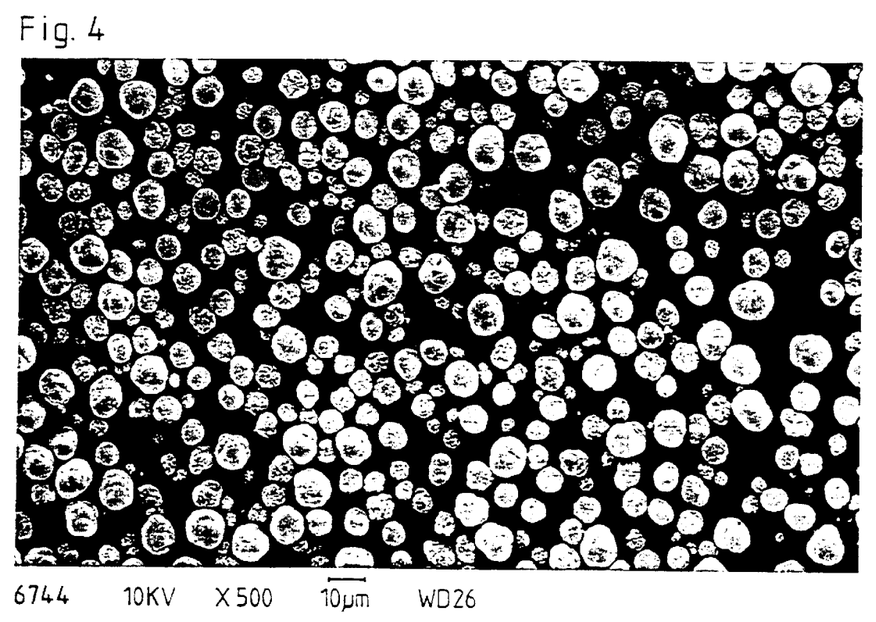

| Example | CoCl₂ soln. g/l | CoCl₂ soln. 1/hour | NaHCO₃ soln. g/l | NaHCO₃ soln. 1/hour | Na₂CO₃ soln. g/l | Na₂CO₃ soln. 1/hour | r [hours] | φ [° C.] | stirrer speed [rpm] | $D_{50}$ [μm] | BET [m²/g] 1) | Co [% by weight] | $CO_3^{2-}$ [% by weight] | SEM [magn.] |
|---|---|---|---|---|---|---|---|---|---|---|---|---|---|---|
| 1 | 150 | 1.1 | 80 | 5.8 | — | — | 2.5 | 80 | 1100 | 10.6 | 1.3 | 54.1 | 29.0 | FIG. 1 500 x 5000 x |
| 2 | 103 | 0.39 | — | — | 150 | 0.48 | 4 | 90 | 600 | 27.6 | 0.8 | 58.4 | 18.3 | FIG. 2 500 x 5000 x |
| 3 | 150 | 5.5 | 80 | 29.0 | — | — | 0.5 | 80 | 1000 | 3.4 | 29 | 53.9 | 29.5 | FIG. 3 500 x 5000 x |
| 4 | 103 | 0.29 | — | — | 150 | 0.36 | 3 | 64 | 1200 | 7.8 | 1.1 | 53.3 | 36.7 | FIG. 4 500 x 5000 x |

1) determined by the single-point nitrogen method according to DIN 66131

Example 5

Production of Spheroidally Agglomerated Cobalt(II) Hydroxide 100 g basic cobalt(II) carbonate from Example 4 were slurried in 200 ml water and mixed with 80 g NaOH dissolved in 600 ml water. The suspension was then heated to 85° C. under argon for 1 hour in a rotary evaporator, and the solid was filtered off by suction and washed with 2 l water. The filter cake was dried to constant weight over KOH in a vacuum desiccator.

85.7 g of pink cobalt(II) hydroxide was obtained, which was a pure phase according to X-ray diffraction analysis. The cobalt content was determined as 61.7% by weight.

Figure 5:
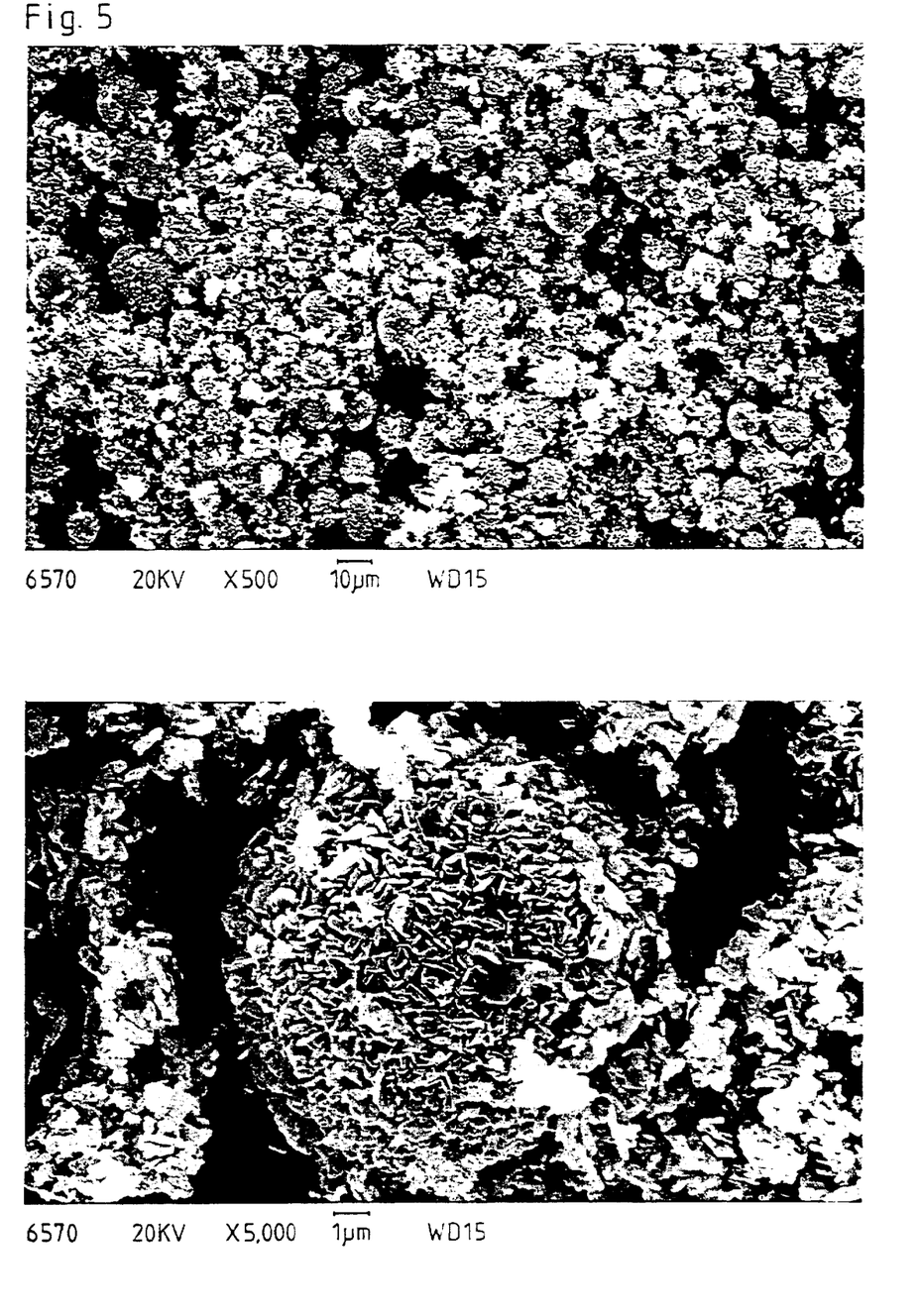

The Na content was 85 ppm. The carbonate content was determined as 0.2%. In addition to small amounts of a fine fraction, the SEM photograph (FIG. 5) shows that the spheroidal secondary structure of the starting material was pre-dominantly retained. The spheroidal agglomerates are built up from hexagonal lamellae which have a diameter of about 1 μm and thicknesses of 0.1 to 0.2 μm.

Example 6

Production of Spheroidally Agglomerated Cobalt(II) Hydroxide 2 kg basic cobalt(II) carbonate from Example 1 were slurried under argon in 5 l water in a stirred reactor. The suspension was mixed with 800 g NaOH dissolved in 3 l water, and heated for 2 hours at 60° C. with slow stirring. It was then filtered and washed with 40 l warm water at 60° C. The filter cake was pre-dried at 40° C. for 12 hours in a vacuum drying oven and then dried to constant weight at 60° C. in a drying oven. 1.72 kg of pink cobalt(II) hydroxide was obtained, which was a pure phase according to X-ray diffraction analysis.

The cobalt content of the material was determined as 62.1% by weight. The chloride and sodium contents were <100 ppm. The residual carbonate content was determined as 0.2% by weight.

Figure 6:
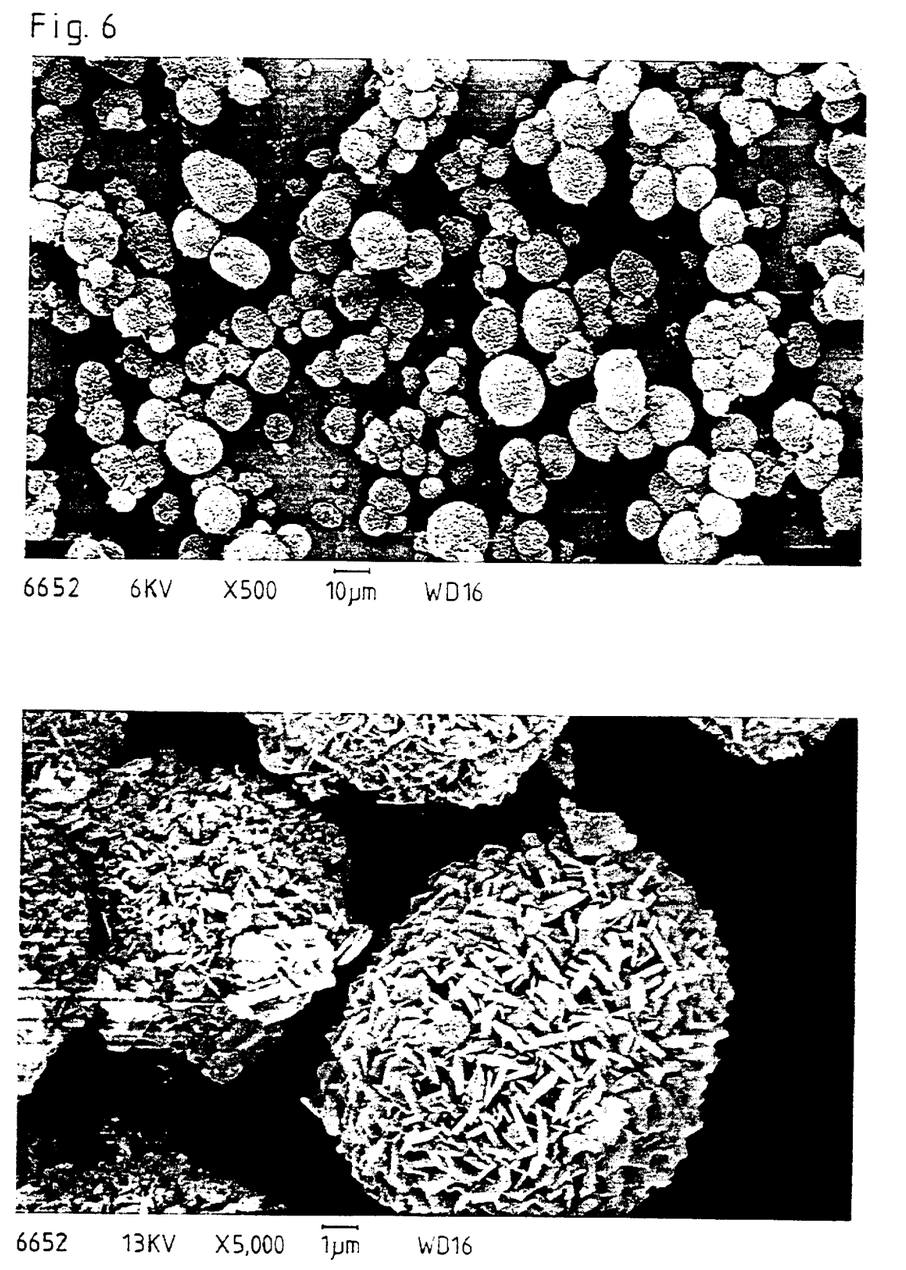

The spheroidally agglomerated cobalt(II) hydroxide obtained was extremely free-flowing. The SEM photographs (FIG. 6) show that the spheroidal structure of the starting material was retained almost completely.

Example 7

Production of Spheroidally Agglomerated Cobalt(II) Oxide From Basic Cobalt Carbonate 500 g basic cobalt(II) carbonate from Example 1 were calcined for 2 hours under argon at 650° C. in quartz boats. The yield obtained was 342 g of light brown cobalt(II) oxide, which was a pure phase according to X-ray diffraction analysis.

The cobalt content was determined as 78.58% by weight. The SEM photograph shows that the spheroidal secondary morphology of the starting material was retained on calcination.

Example 8

Production of Spheroidally Agglomerated Cobalt(II) Oxide From Cobalt(II) Hydroxide 500 g spheroidal cobalt(II) hydroxide from Example 6 were calcined for 2 hours under argon at 650° C. in quartz boats.

Figure 7:
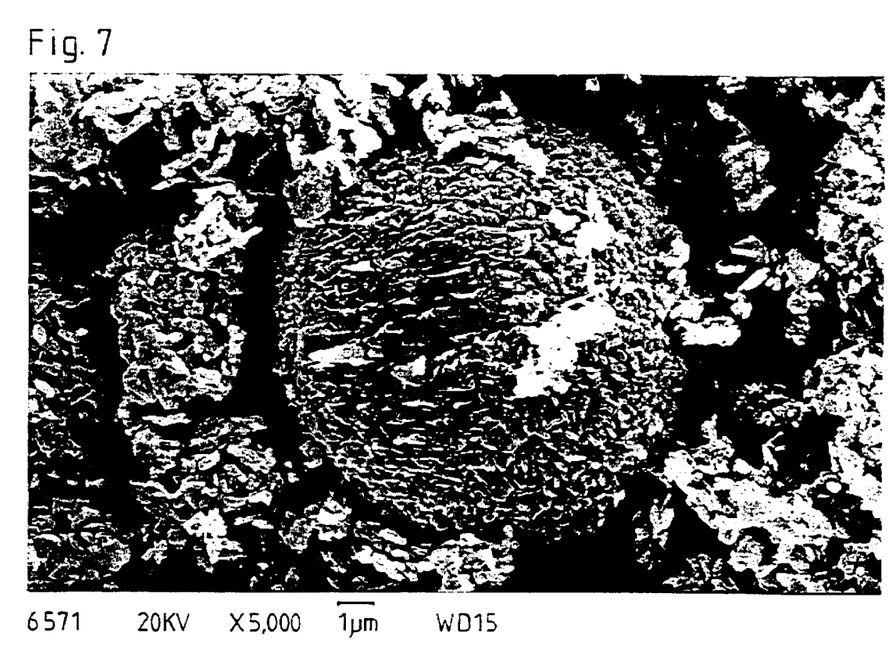

The yield obtained was 392 g of light brown, free-flowing cobalt(II) hydroxide, which was a pure phase according to X-ray diffraction analysis. The cobalt content of the material was determined as 78.57% by weight. The spheroidal secondary structure of the starting material was retained, as shown by the SEM photograph (FIG. 7).

Example 9

Reaction of Spheroidally Agglomerated Basic Cobalt Carbonate With Acetic Acid 100 g basic cobalt(II) carbonate from Example 1 were slurried in 500 ml glacial acetic acid under argon in a 1 liter flask fitted with a reflux condenser and a KPG stirrer. The temperature of the mixture was then slowly increased. Above about 45° C. the commencement of the reaction was observed as a rapidly increasing evolution of $CO_2$. The reaction temperature was allowed to remain at 80° C. for 1 hour and the mixture was thereafter heated for 1 hour under reflux until no more $CO_2$ evolution was observed. Thereafter, the reaction mixture was worked up as follows:

An aliquot portion of 100 ml of the suspension was mixed with 200 ml water and stirred at 80° C. for 5 minutes. A dark red solution was formed, from which red crystals of pure cobalt(II) acetate tetrahydrate were isolated.

The remaining suspension was filtered off through a suction filter and dried by suction for 15 minutes. The filter cake, which was of a compact to crumb-like nature, was dried to constant weight at 75° C. in a drying oven. 65.3 of pink, pure-phase cobalt(II) acetate were obtained. The cobalt content was determined as 27.7% by weight.

Figure 8:
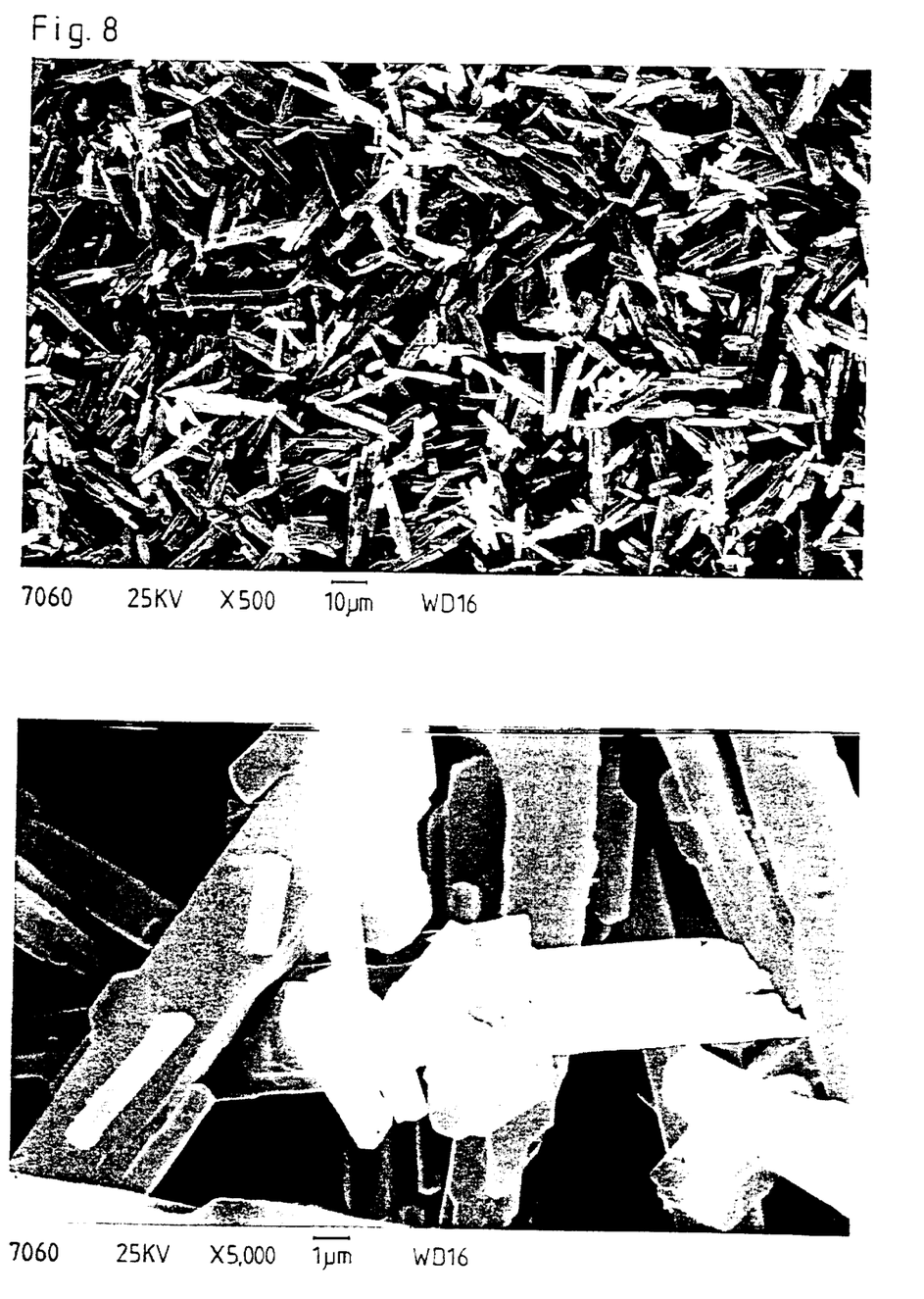

The SEM photograph (FIG. 8) shows uniform, acicular crystals of length 10–20 μm and thickness about 2 μm.

Example 10

Reaction of Spheroidally Agglomerated Basic Cobalt(II) Carbonate With Acetic Acid 20 g basic cobalt(II) carbonate from Example 1 were slurried in 600 ml water under argon in a 1 liter flask fitted with a reflux condenser, and were mixed with 30 ml glacial acetic acid. The mixture was then slowly heated with stirring. Even with gentle heating, the start of the reaction could be identified by the commencement of $CO_2$ evolution.

The reaction proceeded considerably more intensely than the reaction in undiluted glacial acetic acid as in Example 9. The temperature was then carefully increased to 80° C. After about 0.5 hour, a clear, red cobalt(II) acetate solution had been formed.

Example 11

Reaction of Spheroidally Agglomerated Basic Cobalt(II) Carbonate With Phosphoric Acid 200 g basic cobalt(II) carbonate from Example 1 were suspended in 1 l water.

The mixture was heated to 60° C. and mixed over 1.5 hours, with stirring, with 140 g $H_3PO_4$ (85% by weight) dissolved in 1 l water. The mixture was stirred for a further 0.5 hour at the reaction temperature, and was then filtered through a suction filter and the product obtained was washed with 500 ml water.

After drying the filter cake to constant weight at 80° C., 307 g of a pink product was obtained, which was free-flowing after de-agglomeration, which it was possible to effect easily. The cobalt content was determined as 35.7% by weight. X-ray diffraction analysis showed the diffraction spectrum of pure-phase cobalt(II) phosphate octahydrate.

Figure 9:
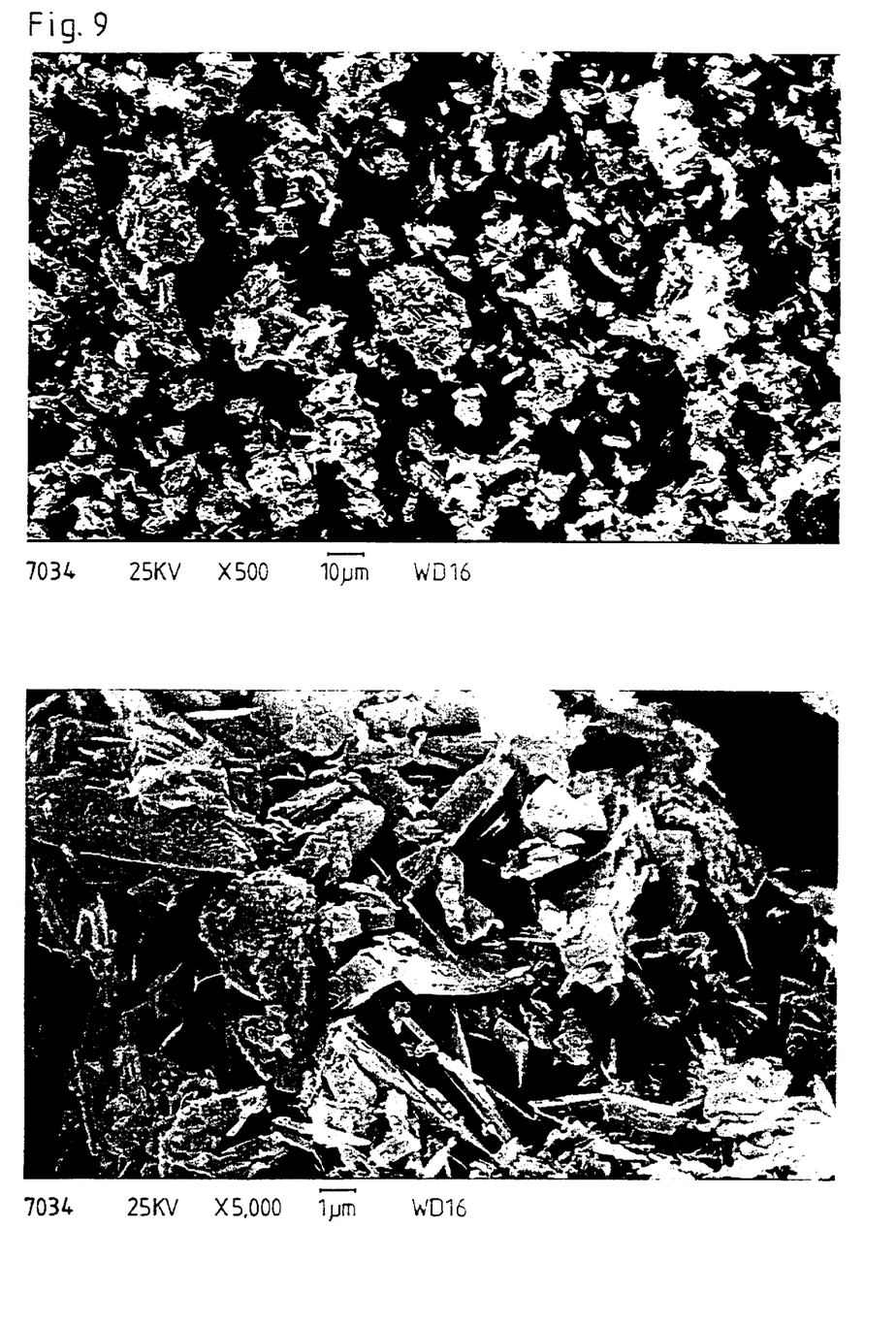

It can be seen from the SEM photograph (FIG. 9) that the agglomerated secondary morphology of the starting material was predominantly retained.

Example 12

Reaction of Spheroidally Agglomerated Basic Cobalt(II) Carbonate With Oxalic Acid 200 g basic cobalt(II) carbonate from Example 1 were suspended in 1 l water.

The mixture was heated to 70° C. and mixed over 2 hours, with stirring, with 266 g oxalic acid dihydrate dissolved in 2 l water.

After the addition was complete, the mixture was stirred for a further 1 hour at the reaction temperature, filtered through a suction filter and the product was washed with 500 ml water. After drying the filter cake to constant weight at 80° C., 350 g cobalt(II) oxalate dihydrate were obtained. The cobalt content was determined as 30.9% by weight.

Figure 10:
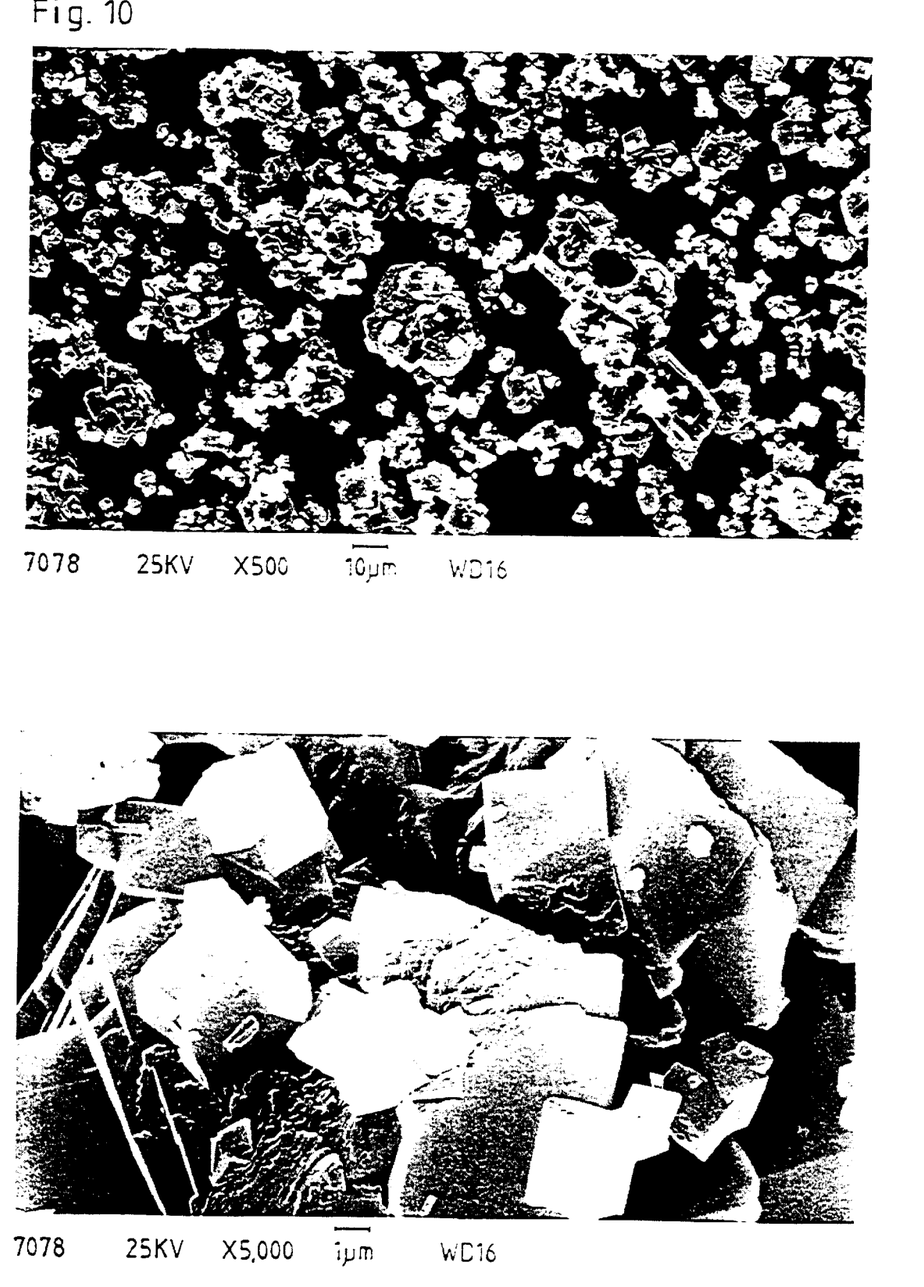

The agglomerated secondary morphology of the starting material was retained (FIG. 10).

We claim:

1. Basic cobalt (II) carbonate, agglomerated from fine primary particles and of general composition $Co[OH]_2]_a$ $[CO_3]_{1-a}$, where $0.1 \leq a \leq 0.9$, wherein the agglomerates have a spheroidal habit and the average agglomerate diameter is 3 to 50 μm.

2. Basic cobalt (II) carbonates according to claim 1, wherein the agglomerate diameter is 5–20 μm.

3. Basic cobalt (II) carbonate agglomerates according to either one of claim 1 or 2, wherein they have tap densities of $\geq 1.6$ g/cm$^3$ and bulk densities of $>1.2$ g/cm$^3$.

4. Basic cobalt (II) carbonates of claim 1 or 2 as made by reacting aqueous solutons of cobalt salts of the general formula $CoX_2$, where X is selected from the group consisting of Cl—, $NO_3$— and ½ $SO_4^{2-}$— with aqueous solutions or suspensions of carbonates selected from the group consisting of alkali carbonates, ammonium carbonates and hydrogen carbonates at temperatures between 40 and 100° C., the reactants being mixed intensively with residence time of mixing operation, at said temperature range, of 0.5 to 10 hours, filtering the residue basic cobalt (II) carbonates and subsequently washing these until they are neutral and free from salts.

5. Basic cobalt (II) carbonate agglomerates according to claim 1 or 2 wherein the spherical habit agglomerates are made up of polygonal lamellar primary particles which have average diameters (spans) of 0.3 μm to 1.5 μm and diameter (span) to thickness ratios between 3 and 15.

6. Basic cobalt (II) carbonate agglomerates according to claim 3 wherein the spherical habit agglomerates are made up of polygonal lamellar primary particles which have average diameters (spans) of 0.3 μm to 1.5 μm and diameter (span) to thickness ratios between 3 and 15.

7. Basic cobalt (II) carbonates of claim 3 as made by reacting aqueous solutions of cobalt salts of the general formula $CoX_2$, where X is selected from the group consisting of Cl—, $NO_3$— and ½ $SO_4^{2-}$— with aqueous solutions or suspensions of carbonates selected from the group consisting of alkali carbonates, ammonium carbonates and hydrogen carbonates at temperatures between 40 and 100° C., the reactants being mixed intensively with residence time of mixing operation, at said temperature range, of 0.5 to 10 hours, filtering the resulting basic cobalt (II) carbonates and subsequently washing these until they are neutral and free from salts.

* * * * *